(12) United States Patent
Winkelmuller et al.

(10) Patent No.: US 7,353,801 B2
(45) Date of Patent: Apr. 8, 2008

(54) VALVE REGULATING DEVICE AND INTAKE MANIFOLD COMPRISING AT LEAST ONE SUCH DEVICE

(75) Inventors: Hugues Winkelmuller, Riquewihr (FR); Steve Block, Ban de Laveline (FR); Philippe Rohmer, Chatenois (FR)

(73) Assignee: Mark IV Systemes Moteurs, Courbevoie (FR)

( * ) Notice: Subject to any disclaimer, the term of this patent is extended or adjusted under 35 U.S.C. 154(b) by 0 days.

(21) Appl. No.: 11/543,984

(22) Filed: Oct. 6, 2006

(65) Prior Publication Data

US 2007/0084437 A1 Apr. 19, 2007

(30) Foreign Application Priority Data

Oct. 7, 2005 (FR) .................................. 05 10287

(51) Int. Cl.
*F02D 9/10* (2006.01)
*F16K 1/22* (2006.01)

(52) U.S. Cl. .................. 123/336; 251/305; 251/306; 251/308; 123/337

(58) Field of Classification Search ................ 123/336, 123/337; 251/305, 306, 308
See application file for complete search history.

(56) References Cited

U.S. PATENT DOCUMENTS

| | | | | |
|---|---|---|---|---|
| 3,910,552 | A * | 10/1975 | Hills et al. ................... | 251/148 |
| 5,236,003 | A * | 8/1993 | Habicht ................. | 137/315.22 |
| 5,620,167 | A * | 4/1997 | Habicht ....................... | 251/306 |
| 5,715,782 | A * | 2/1998 | Elder ..................... | 123/184.61 |
| 5,979,872 | A | 11/1999 | Stearns et al. | |
| 6,216,666 | B1 * | 4/2001 | Handl et al. ................ | 123/308 |
| 6,321,718 | B1 | 11/2001 | Mangold et al. | |
| 6,354,267 | B1 * | 3/2002 | Kotchi et al. ............... | 123/337 |
| 6,554,250 | B2 | 4/2003 | Alves et al. | |
| 6,708,949 | B2 * | 3/2004 | Twito .......................... | 251/305 |
| 6,763,802 | B1 * | 7/2004 | Brassell ...................... | 123/336 |
| 6,895,926 | B1 * | 5/2005 | Moreau et al. ............. | 123/336 |
| 7,090,193 | B2 * | 8/2006 | Kamesawa .................. | 251/305 |
| 2002/0108601 | A1 | 8/2002 | Dietz et al. | |

(Continued)

FOREIGN PATENT DOCUMENTS

DE 24 27 995 1/1976

(Continued)

*Primary Examiner*—Stephen K. Cronin
*Assistant Examiner*—J. Page Hufty
(74) *Attorney, Agent, or Firm*—Berenato, White & Stavish

(57) ABSTRACT

A valve regulating device intended to regulate the circulation of a fluid in the region of an opening, said device consisting of a pivoting valve body, of an annular support body integrating two opposing bearings mounting said valve body in a rotational manner, and of a control pin, wherein said valve body may be displaced in rotation between a totally open position and a closed position, in which it rests against the annular seat provided by the support body; the support body is provided with a seal with a first extending functional segment and a second extending functional segment having protruding lateral extensions, for example in the form of ribs, on the face of the support body that bears against the edge of the opening, said extensions also being interconnected by intermediate joining portions, which also extend in a protruding manner over the bodies of the two opposing bearings so as to provide a continuous peripheral seal around the opening when the regulating device is mounted on said opening.

22 Claims, 14 Drawing Sheets

U.S. PATENT DOCUMENTS

2004/0003841 A1 1/2004 Rentschler et al.
2005/0016602 A1 1/2005 Schub et al.

FOREIGN PATENT DOCUMENTS

| | | |
|---|---|---|
| DE | 24 27 995 A1 | 1/1976 |
| DE | 20 2004 020 030 U1 | 3/2005 |
| EP | 0 733 790 A2 | 9/1996 |
| EP | 0 968 360 B1 | 1/2000 |
| EP | 1 380 741 A1 | 1/2004 |
| FR | 2 805 878 | 9/2001 |
| FR | 2 816 006 | 5/2002 |
| FR | 2 819 557 | 7/2002 |
| GB | 2 249 611 A | 5/1992 |
| WO | WO 96/07041 | 3/1996 |

* cited by examiner

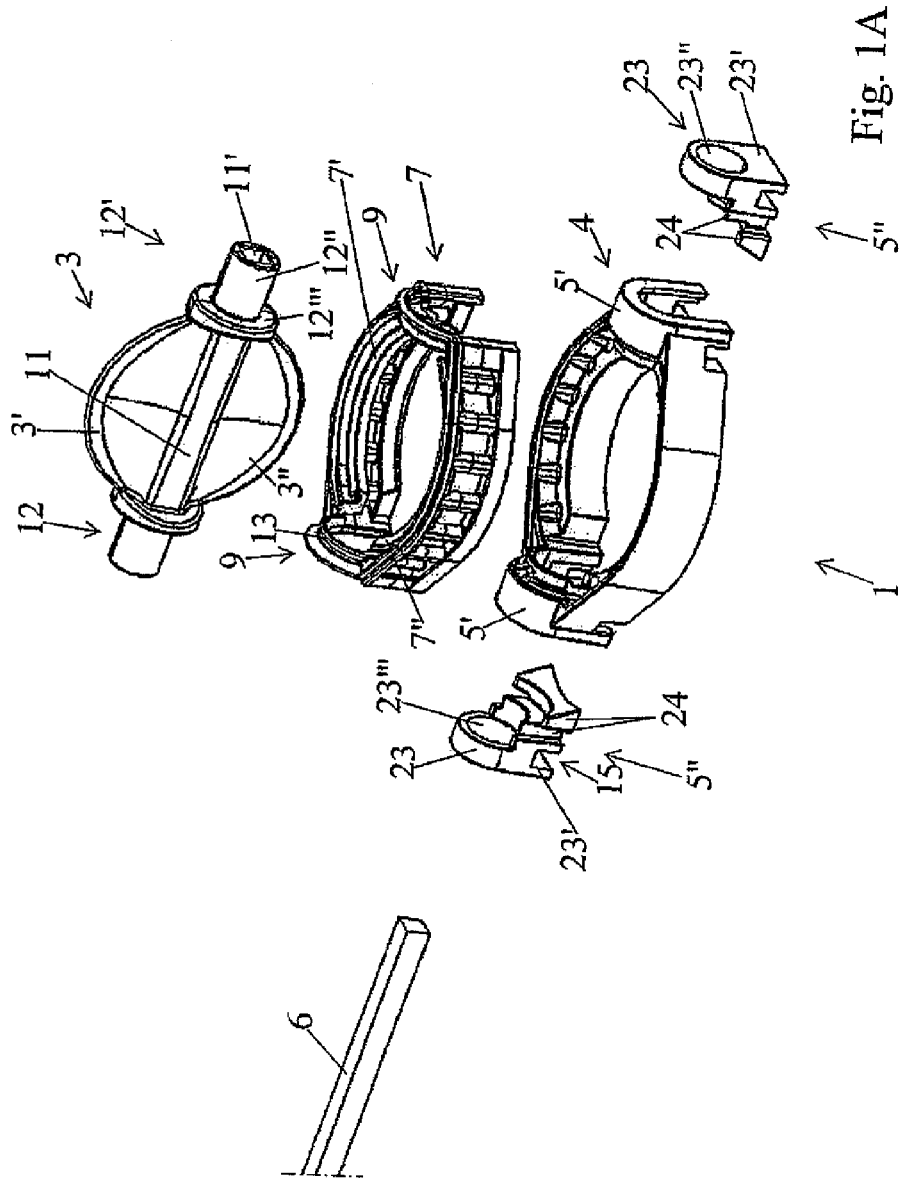

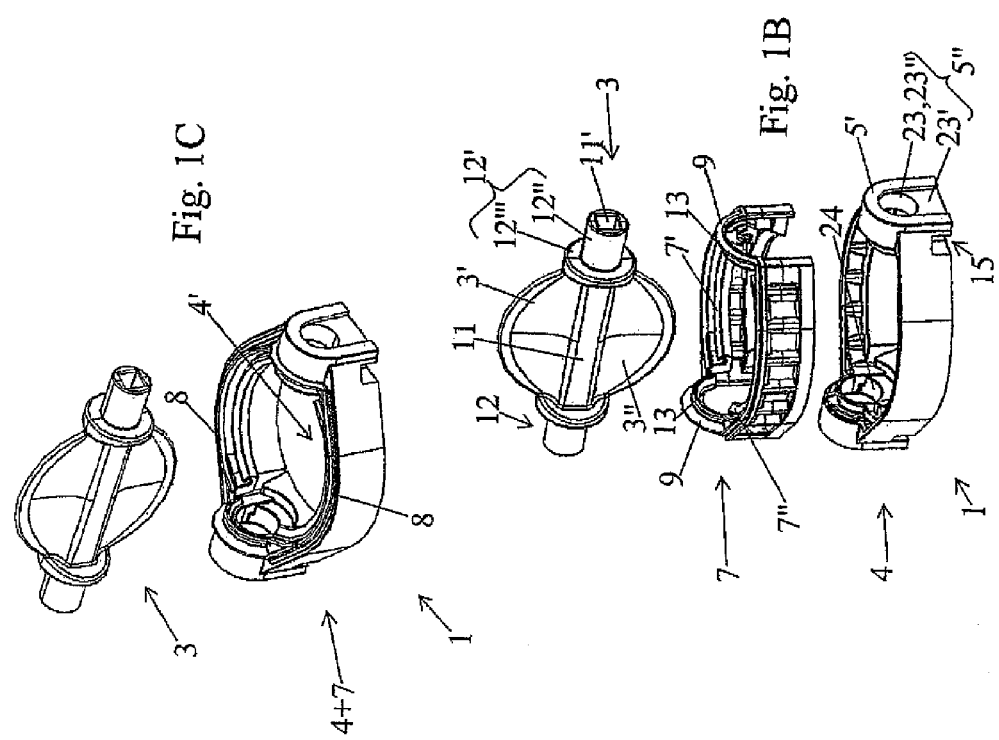

VALVE REGULATING DEVICE AND INTAKE MANIFOLD COMPRISING AT LEAST ONE SUCH DEVICE

The present invention concerns the field of controlling and regulating the flow of fluids, especially gaseous fluids, in the region of an opening or at the outlet of a conduit, in particular within air intake systems for internal-combustion engines, for example in relation to intake manifolds or distributors.

The present invention relates to a valve regulating device and to an intake manifold or distributor comprising at least one such device.

BACKGROUND OF THE INVENTION

A plurality of valve devices for regulating the flow rate or the variation in flow of a fluid in a conduit, tube or the like are known.

French patent application No. 2 805 878, in the name of the Applicant thus proposes a flap valve device in which the valve body bears, in the closure position, on inner projections in the passage receiving said device, the transition from the open state to the closed state of said device being obtained by limited pivoting of said valve body.

However, the scope for displacing the valve body in the closure position, while maintaining tightness, is very limited and does not allow any play in the region of the control means to be taken up.

However, such play is frequently present in regulating assemblies encompassing a plurality of valve devices controlled simultaneously by a single control member.

U.S. Pat. No. 2,856,128, in the name of the Applicant, proposes a valve regulating device providing an effective seal in the closed state of the valve.

This device is in the form of a cartridge to be inserted transversely into an incision formed in the conduit, comprising, in addition to the valve body, a frame forming a support for said valve and defining a portion of said conduit, and a portion forming a plug.

This device, which requires precise mounting, especially for preserving the tightness of the conduit in which it is mounted, is awkward to install, in particular when a plurality of these devices have to be mounted simultaneously. Moreover, since the seal of the valve is attached to the outer circumference of said valve, it is constantly exposed to the flow.

Furthermore, document EP-A-0 968 360 discloses a valve regulating device intended to regulate the circulation of a fluid in the region of an opening. This device consists of a pivoting plate-shaped valve body, of an annular-shaped support body providing a seat for at least a portion of the peripheral edge of said valve body and carrying or integrating two opposing bearings mounting said valve body in a rotational manner, and of a control pin determining the position in rotation of said valve body and passing through said body by dividing it into two opposing shutter-like portions, wherein said valve body may be displaced in rotation between a totally open position, in which it opposes a minimum visible surface generated by the flow of fluid, and a closed position, in which it rests against the annular seat or seat portion provided by the support body and closes the passage through the annular support body, said device being intended to be attached in the region of the regulated opening by application of the annular support body against the edge delimiting the circumference of this opening.

This document also discloses an intake manifold integrating a plurality of such regulating devices.

However, these devices have, in particular, a poor seal in the closed state of the valve device and a complex control mechanism.

SUMMARY OF THE INVENTION

The object of the present invention is to overcome at least some, and preferably all, of the aforementioned drawbacks.

It therefore relates to a valve regulating device of the aforementioned type, characterised in that the support body is provided with a seal with, on the one hand, a first functional segment extending over a first portion of the internal periphery of the annular support body and bearing against a face of a first of the two shutter-like portions of the valve body in the closed position and, on the other hand, a second functional segment extending over a second portion of the internal periphery of the annular support body, having a different composition from that of the first functional segment and bearing against the opposing face of the other or second shutter-like portion of the valve body in the closed position.

BRIEF DESCRIPTION OF THE DRAWINGS

A better understanding of the invention will be facilitated by the following description, which relates to preferred embodiments, given by way of non-limiting examples and explained with reference to the accompanying schematic drawings, in which:

FIG. 1A is an exploded perspective view of a regulating device according to a first embodiment of the invention;

FIGS. 1B and 1C are exploded perspective views of the device according to FIG. 1A, respectively after mounting of the bearing elements (FIG. 1B) and after fitting of the seal (FIG. 1C);

DETAILED DESCRIPTION OF THE INVENTION

Figure 1F:
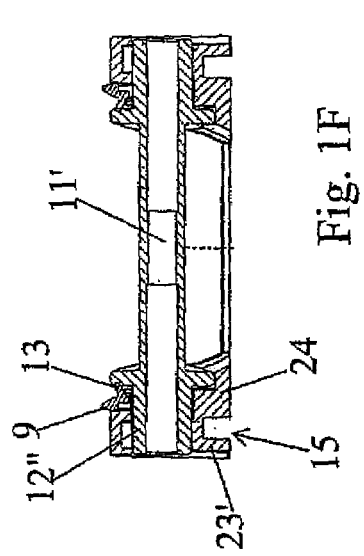
FIGS. 1F and 1G are cross-sections along A-A of the device of FIG. 1D and along B-B of the device of FIG. 1E, respectively.

FIGS. 1, 2, 3, 4 and 5 show a valve regulating device 1 intended to regulate the circulation of a fluid in the region of an opening 2.

This device 1 consists of a pivoting plate-shaped valve body 3, of an annular-shaped support body 4 providing a seat for at least a portion of the peripheral edge of said valve body 3 and carrying or integrating two opposing bearings 5 mounting said valve body 3 in a rotational manner, and of a control pin 6 determining the position in rotation of said valve body 3 and passing through said body by dividing it into two opposing shutter-like portions 3' and 3".

This valve body 3 may be displaced in rotation between a totally open position, in which it opposes a minimum visible surface generated by the flow of fluid, and a closed position (preferably substantially at 90° from the open position), in which it rests against the annular seat or seat portion provided by the support body 4 and closes the passage 4' through said annular support body 4, said device 1 being intended to be attached in the region of the opening 2 to be regulated by application of the annular support body 4 against the edge 2' delimiting the circumference of this opening 2, preferably to be mounted between an outlet and an inlet by providing a passage portion therebetween.

According to the invention, the support body 4 is provided with a seal 7 with, on the one hand, a first functional segment 7' extending over a first portion 4" of the internal periphery of the annular support body 4 and bearing against a face of a first 3' of the two shutter-like portions 3', 3" of the valve body 3 in the closed position and, on the other hand, a second functional segment 7" extending over a second portion 4'" of the internal periphery of the annular support body 4, having a different composition from that of the first functional segment 7' and bearing against the opposing face of the other or second shutter-like portion 3" of the valve body 3 in the closed position.

Such a dissymmetrical composition of the seal 7 provides optimal tightness in the closed state of the valve, the degree of tightness increasing in tandem with the closure force, and may be optimised in the normal direction of flow, while at the same time using a simple (substantially planar and flat) valve body.

According to a first highly advantageous characteristic of the invention, the first and second functional segments 7' and 7" of the seal 7 have protruding lateral extensions 8, for example in the form of ribs, in the region of the face of the support body 4 bearing against the edge 2' of the opening 2, said extensions 8 being interconnected by intermediate joining portions 9 also extending in a protruding manner over the bodies 5' of the two opposing bearings 5, so as to provide a continuous peripheral seal around the opening 2 in the region of which the flow is to be regulated when the regulating device 1 is mounted on said opening.

Figure 11:
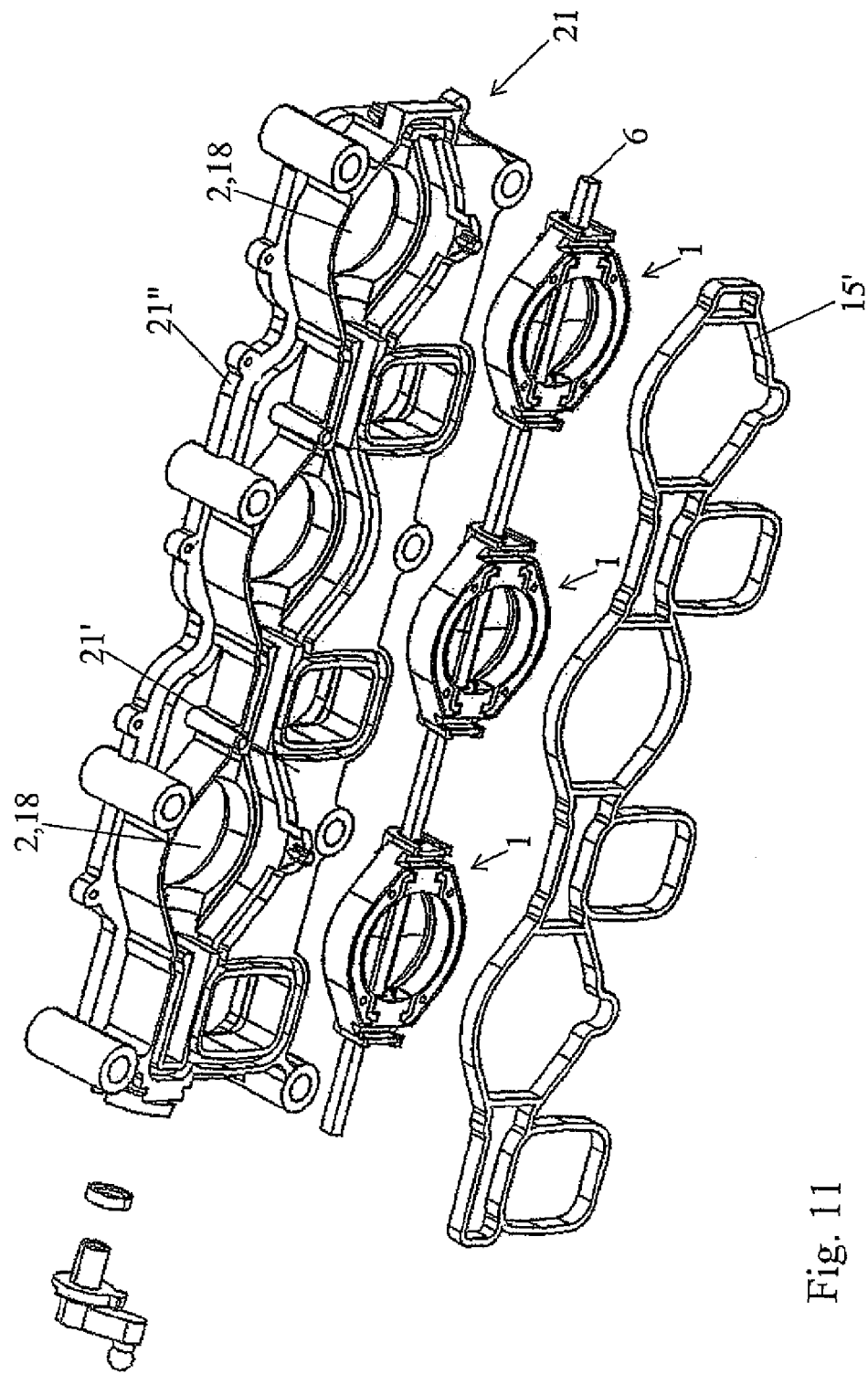
FIG. 11 is a partial perspective view, from a different angle, of the manifold of FIG. 10, the control axis having been introduced into the valve bodies of the regulating devices.

The form of the edge 2' of the opening 2 does, of course, match that of the face of the support body 4 bearing against it, a compression seal 8, 9 being interposed continuously and under stress (compression) (with regard to the form of the edge 2', see FIG. 11).

The support body 4 and the valve body 3 are preferably circular in shape, although other shapes are also possible.

These two bodies 4 and 3 are preferably made entirely of an optionally fibre-reinforced thermoplastic material (injection-moulding). However, in a variation, they may also have a metal core overmoulded with a thermoplastic material. The two shutter portions 3' and 3" (which may have different shapes) of the valve body 3, like the tubular body 11, may thus have a metal core overmoulded with a thermoplastic material.

According to a preferred embodiment of the invention, the valve body 3 is mounted on the support body 4 so as to be offset toward the face bearing against the edge 2' of the opening 2, the first 3' of the two shutter-like portions 3', 3" of the valve body 3 pivoting as it moves away from the annular support body 4 when said valve body 3 leaves the closed position, while the second shutter-like portion 3" pivots simultaneously within the internal passage 4' of said support body 4. Moreover, the first functional segment 7' is subjected to compressive stress in the closed position of the valve body 3, between said valve body and the first portion 4" of the internal periphery of the annular support body 4 carrying this first functional segment 7' and forming part of the seat, and the second functional segment 7" extends in an overhang arrangement from the second portion 4'" of the internal periphery of the annular support body 4 and is flexurally stressed by the valve body 3 in the closed position thereof (see FIGS. 1B, 1C, 1G, 2 and 5B).

Such a separate configuration of the two functional segments 7' and 7" of the seal provides, in relation to a pivoting valve, tightness optimised for closure in the case of a fluid circulating normally through the annular support body 4 and originating from the opening 2.

The size of the valve body 3 and that of the passage 4' of the annular support body 4, like the positioning of the valve body 3 within said passage (decentring relative to a central position), are defined in such a way that the portion (3') of the valve enters into abutment with the first portion 4" of the internal periphery of the support body 4 (preferably in the form of a shoulder) in the closed state, while the second shutter-like portion 3" pivots freely and remote from the second portion 4'" of this internal periphery, entering into contact merely with the second functional segment 7".

According to a highly advantageous practical configuration, and as FIGS. 1 to 5 of the accompanying drawings show, the first and second functional segments 7' and 7" consist of lip seals and have profiled wing compositions following the contour of the internal periphery 4", 4'" of the annular support body 4, the first functional segment 7' of the seal 7 consisting of a wing inclined toward the exterior and formed in one piece with a base 10, which rests on the first portion 4" of the internal periphery of the annular support body 4 and against which said inclined wing 7' is turned down and enters into surface contact in the compressed state, and the second functional segment 7" consisting of a wing protruding toward the interior as a result of being slightly inclined, this wing 7" being at least slightly resiliently flexurally stressed under the action of the valve body 3 when said valve body enters the closed position.

The practical solution thus proposed by the invention is inspired by that disclosed in the aforementioned French patent application No. 2 856 128, except the functional segments of the seal 7 are integral with the support body 4, rather than with the valve body 3, thus rendering said valve body simpler to produce and disrupting the flow less in the open position of the valve body.

The annular support body 4 may comprise first and second internal peripheral portions 4" and 4"' having different radii, and the second internal peripheral portion 4"' may comprise, toward the face opposing the annular support body 4 (opposing the face placed around the opening 2), an inner face inclined toward the interior.

In order to allow fixing of the pin 6 and to provide guided and wedged holding of the valve body, said valve body comprises a central tubular formation 11 providing a profile through-passage 11' receiving the control pin 6 with rotational locking, Furthermore, said valve body 3 is extended at the two opposing ends of said tubular formation 11 by hollow fittings 12, 12' forming hubs having a tiered circular outer shape, these fittings cooperating to mount, in a freely rotational manner and with translational locking, the valve body 3 in the opposing bearings 5 of the support body 4, the bodies 5' or the functional elements 5" of the bearings 5 having an internal configuration matching the external configuration of the hub-forming fittings 12, 12', and said hubs having through-passages adjacent to the through-passage 11' of the central tubular formation 11 and also being passed through by the control pin 6.

In order to ensure an effective seal in the region of the bearings 5 and to provide guided and wedged mounting of the regulating device 1 in the region of the opening 2 to be regulated, it is advantageously provided that the bodies 5' of the bearings 5 protrude on the side of the annular support body 4 that is intended to bear against the edge 2' of the opening 2, and that the intermediate joining portions 9 are in the form of an arc of a circle and are each extended by a sealing lip 13 bearing against the hub fitting 12, 12' of the valve body 3 engaged with the bearing 5 in question, so as to form, in cooperation with the two functional segments 7 and 7" of the seal 7, a continuous seal between the annular support body 4 and the valve body 3 in the closed state of said valve body.

So as to optimise the seal in the region of the bearings 5, in particular relative to the edge 2' of the opening 2, the portion of the bodies 5' of the bearings 5 that protrudes relative to the annular support body 4 is partially indented so that only an end portion of the side of the face of the support body 4 that is intended to be placed around the opening 3 of the tiered hub fitting 12, 12' is held and guided in the bearing 5 in question, the sealing lip 13 at least resting on the released portion of said portion 12" of smaller diameter.

Preferably, and as FIGS. 1B, 1C, 1E, 1F, 5A, 6A and 6B of the drawings, in particular, show, each of the profiled sealing lips 13, which are in the form of an arc of a circle and rest on one of the two hollow tiered hub fittings 12, 12', is in section substantially in the shape of a V, one of the wings of which is connected to the corresponding intermediate joining portion 9, the other wing of which bears at its free end against the shoulder 12"' formed by the projection on the outer face of the fitting 12, 12' in question, and the median ridge of which, formed at the intersection of the two wings, bears against the released portion of the end portion 12" of smaller diameter of the fitting 12, 12' in question.

According to a first variation of the invention emerging from FIG. 1 (FIGS. 1A to 1G), the annular support body 4 and at least a portion of the bodies 5' of the bearings 5 are formed in one piece.

More precisely, that the one-part piece comprises, on the one hand, the two opposing segments of the annular body 4 forming the first and second portions 4" and 4"' of the internal periphery of said annular body and, on the other hand, the bodies 5' of the opposing bearings 5 enclosing the bearing elements 5", which are formed or attached in these bodies 5'.

As FIGS. 1A, 1C, 1E and 1F of the accompanying drawings, in particular, show, each bearing 5 may consist of a body 5' forming a casing or structure for receiving a bearing element 5", the process for mounting said bearing element consisting in wedged interlocking, with rotational locking, of said element 5" in said body 5', and each bearing element 5" may comprise an upper portion 23 integrating a recess 23" for the fitting process, with sliding rotational guiding of the valve body 3, and a lower portion 23' forming a support base for the bearing element 5" when the regulating device 1 is mounted between the edges of two opposing openings.

According to one characteristic of the invention, it may be provided for each element 5", that the lower portion 23' forming a support base has lateral extensions 24 defining recess portions for guiding the two portions having different diameters of a tiered hub fitting 12. 12' of the valve body 3, wherein these extensions 24 may be interlocked in a mating manner in corresponding cavities in the bearing body 5', which defines the complementary portions of the aforementioned guiding recesses extending concentrically in the extension of the recess 23" in the upper portion 23 of the bearing element 5".

According to an additional advantageous characteristic, the seal 7, integrating the first and second functional segments 7' and 7", the extensions 8 of said functional segments, the intermediate joining portions 9 and the sealing lips 13 extending said functional segments, is formed in one piece and is attached by overmoulding to the annular support body 4, in the region of its face that is placed around the opening 2, the outflow of which is to be regulated (see FIGS. 1A and 1B).

In order to reinforce the connection between the body 4 and the seal 7, especially if said seal is attached by overmoulding and the constituent materials of the two components are at least partly incompatible, it may be provided that the support body 4, and optionally the bearing bodies 5', is/are provided with sites for mechanically coupling or anchoring the seal 7, and optionally the intermediate joining portions 9, for example in the form of cavities and passages allowing the establishment of bridges made from overmoulded material.

Figure 1G:
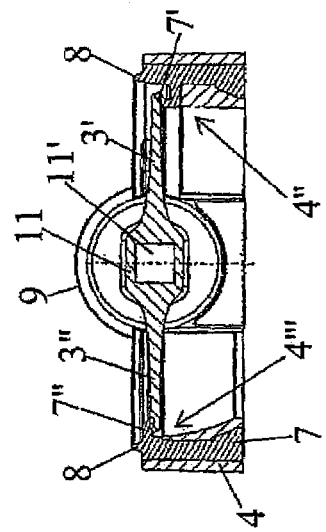
Figure 1D:
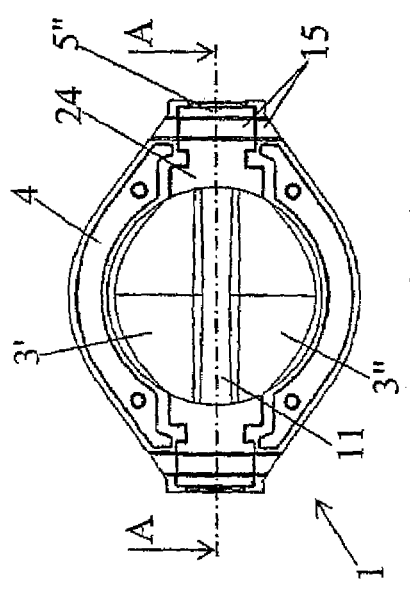
FIGS. 1D and 1E are views from below and in lateral elevation, respectively, of a device as illustrated in FIGS. 1A, 1B and 1C after assembly of its various components.
Figure 1E:
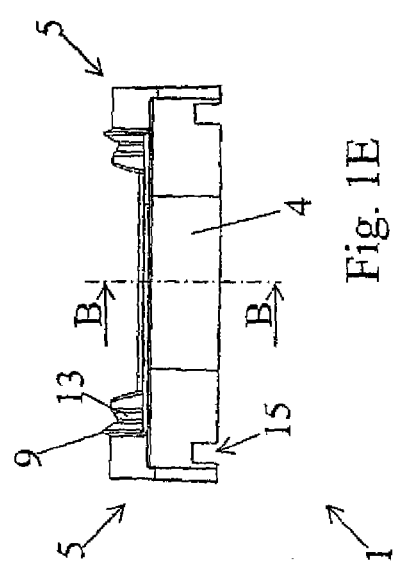
Figure 2A:
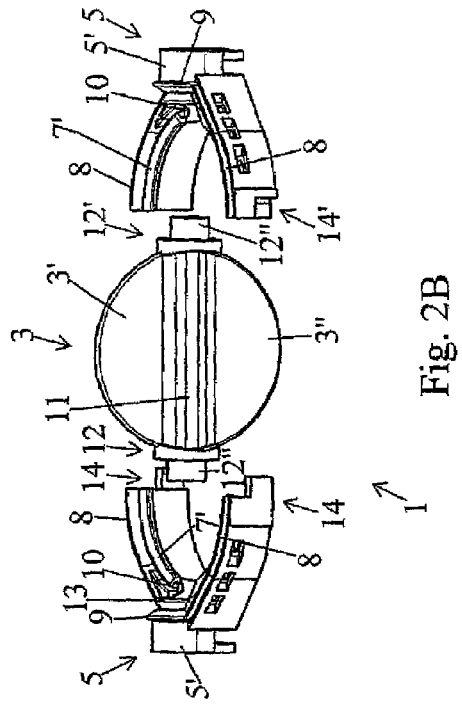
FIGS. 2A and 2B are exploded perspective views, from two different angles, of a regulating device according to a second embodiment of the invention.
Figure 2B:
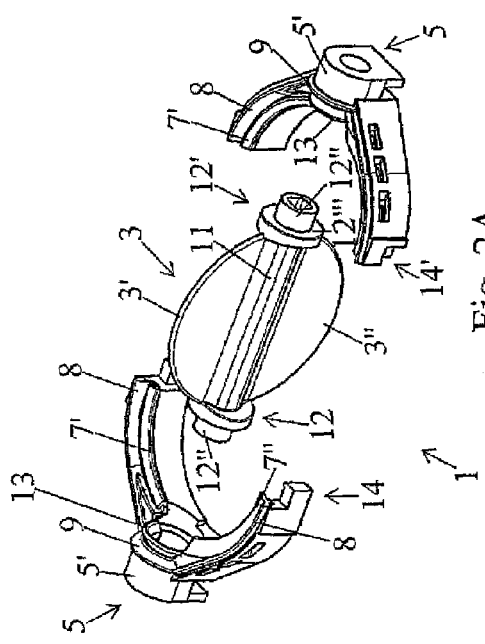
Figure 3:
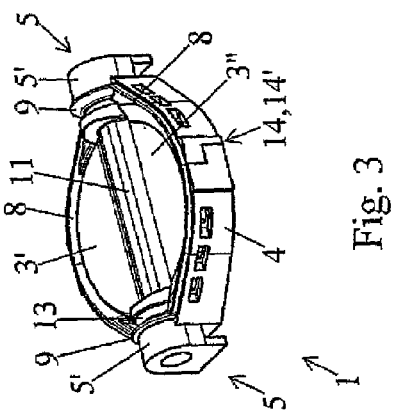
FIG. 3 is a perspective view of a regulating device in the assembled state (without the control pin) corresponding to those illustrated in FIGS. 2A, 2B and 2C.
Figure 2C:
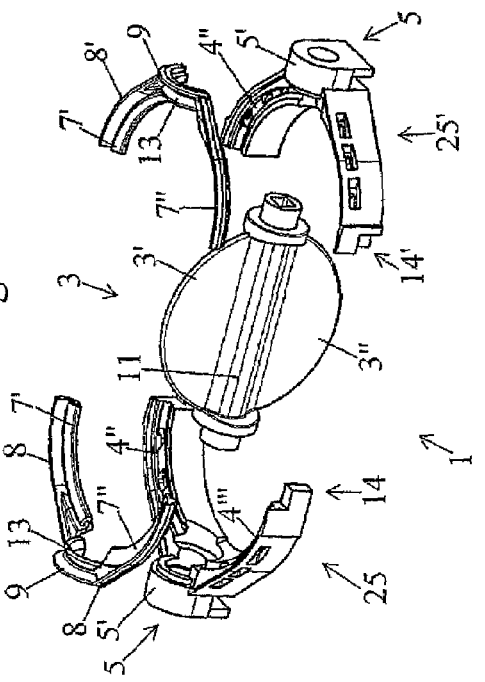
FIG. 2C is a view similar to that of FIG. 2A, the two portions of the seal being separated from the two portions of the support body.
Figure 4A:
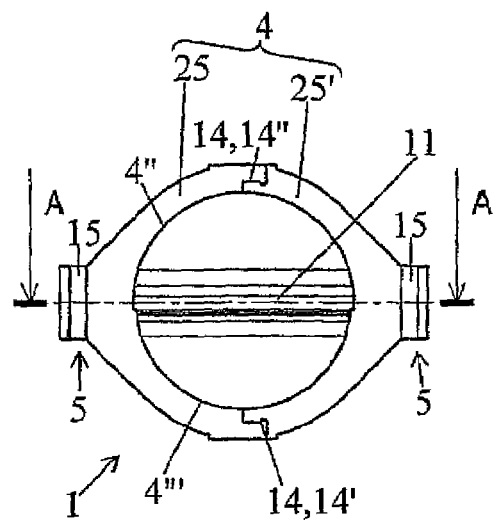
FIGS. 4A, 4B and 4C are views from below, in lateral elevation and from above, respectively, of the regulating device of FIG. 3.
Figure 4B:
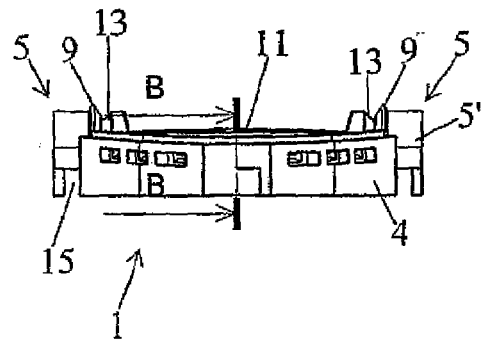
Figure 12:
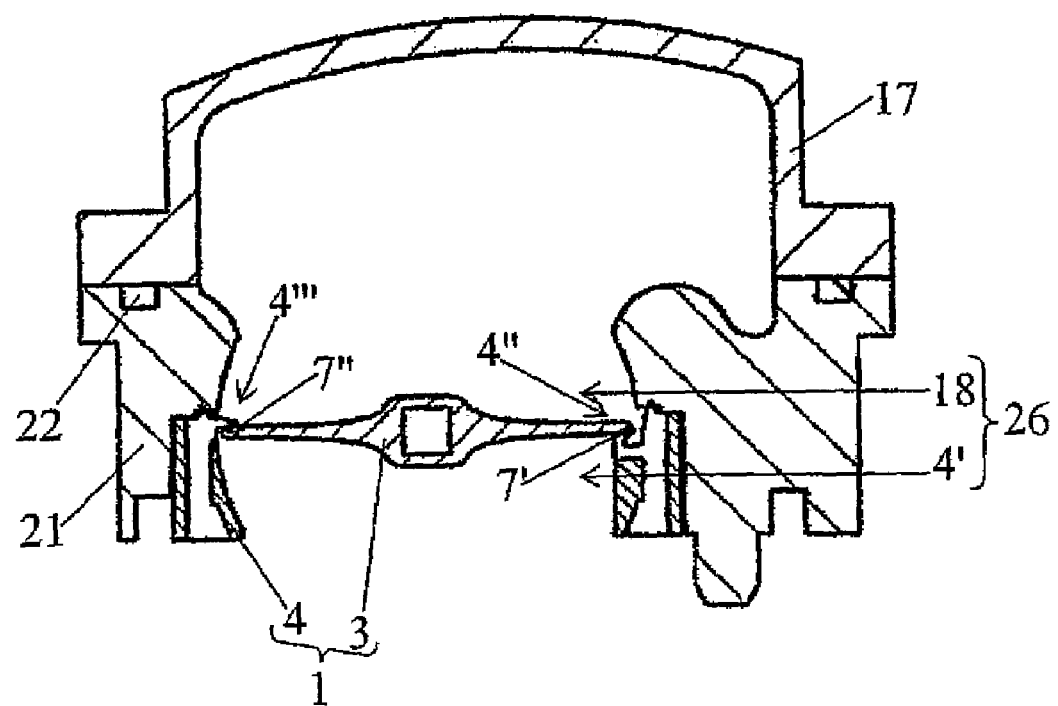
FIG. 12 is a partial and simplified cross-section along A-A of the manifold illustrated in FIG. 6A.
Figure 13:
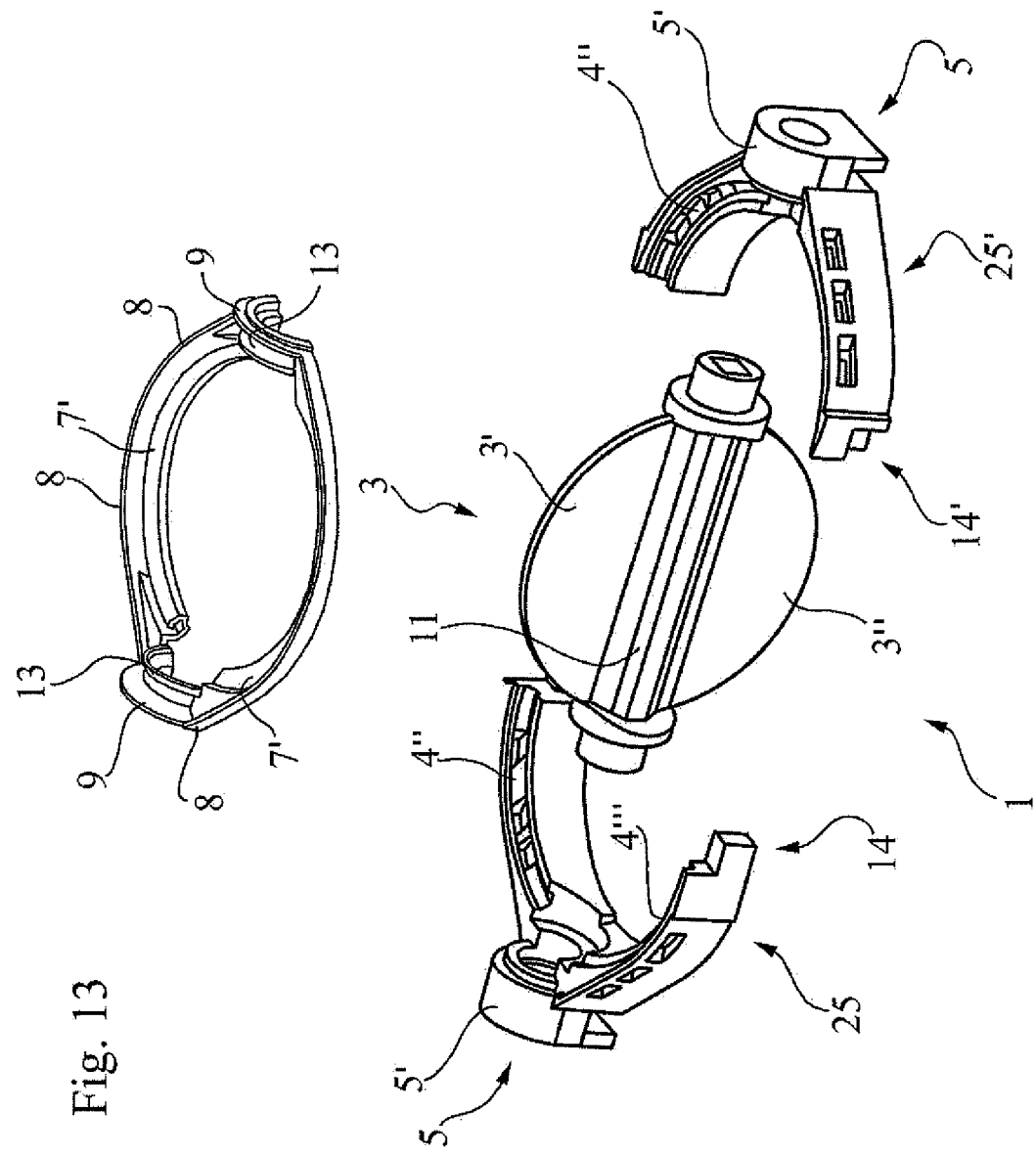
FIG. 13 is an exploded view of an alternate embodiment of the presently claimed invention.

In an optimal manner, the support body 4 may optionally have a basically hollow, double-wall structure, into which a more pliable material is injected, this material also forming the seal 7 (see FIGS. 1G, 12).

According to a second variation of the invention emerging from FIGS. 2 to 5 and 7 to 9 of the accompanying drawings, the annular support body 4 consists of two identical half-bodies 25 and 25' joined at a plane perpendicular to the plane of said support body 4 and median relative to the two bearings 5. In this case, each half-body 25, 25' integrates a bearing 5 extended on each side by a support body portion 4 so as together to form one half 25, 25' of said bearing, and each half-body 25, 25' is provided with a half-seal comprising, in the form of an overmoulded portion, one half of the first functional segment 7', one half of the second functional segment 7, the corresponding halves of the lateral extensions 8 of said functional segments, an intermediate joining portion 9 connecting said two aforementioned halves, and also a sealing lip 13 extending this joining portion 9.

The two half-bodies 25 and 25' are preferably assembled by mutual nesting of the free ends of the two support body portions 4 provided with matching incisions 14, 14', the two halves of the first and second functional segments 7' and 7" of the seal 7 entering into adjacent abutment in the assembled state of the two half-bodies 25 and 25', and the assembly optionally being locked by resilient engagement or coupling in the region of the incisions 14, 14' in the joined free ends of the two half-bodies 25 and 25'.

According to a third variation, not shown in the accompanying drawings and incorporating features of the two aforementioned variants, the annular support body 4 may consist of two identical half-bodies 25 and 25' joined at a plane perpendicular to the plane of said support body 4 and median relative to the two bearings 5, the assembly optionally being produced by connection by mutual nesting of the free ends of said two support body portions 4, and the seal 7, integrating the first and second functional segments 7', 7", the extensions 8 of said functional segments, the intermediate joining portions 9 and the sealing lips 13 extending said functional segments, may be formed in one piece and is attached by overmoulding to the annular support body 4, in the region of its face that is placed around the opening 2, the outflow of which is to be regulated.

Figure 5A:
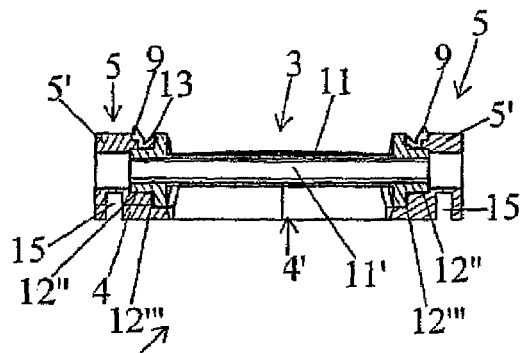
FIGS. 5A and 5B are cross-sections along A-A of the device of FIG. 4A and along B-B of the device of FIG. 4B, respectively.
Figure 5B:
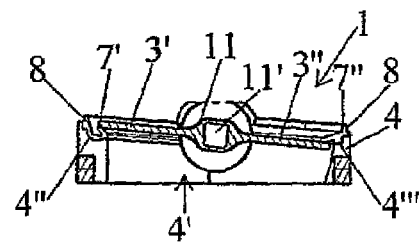
Figure 4C:
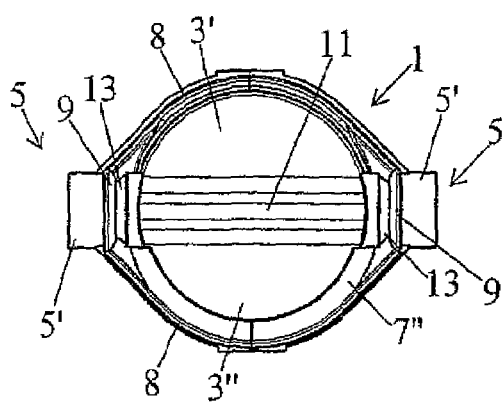
Figure 10:
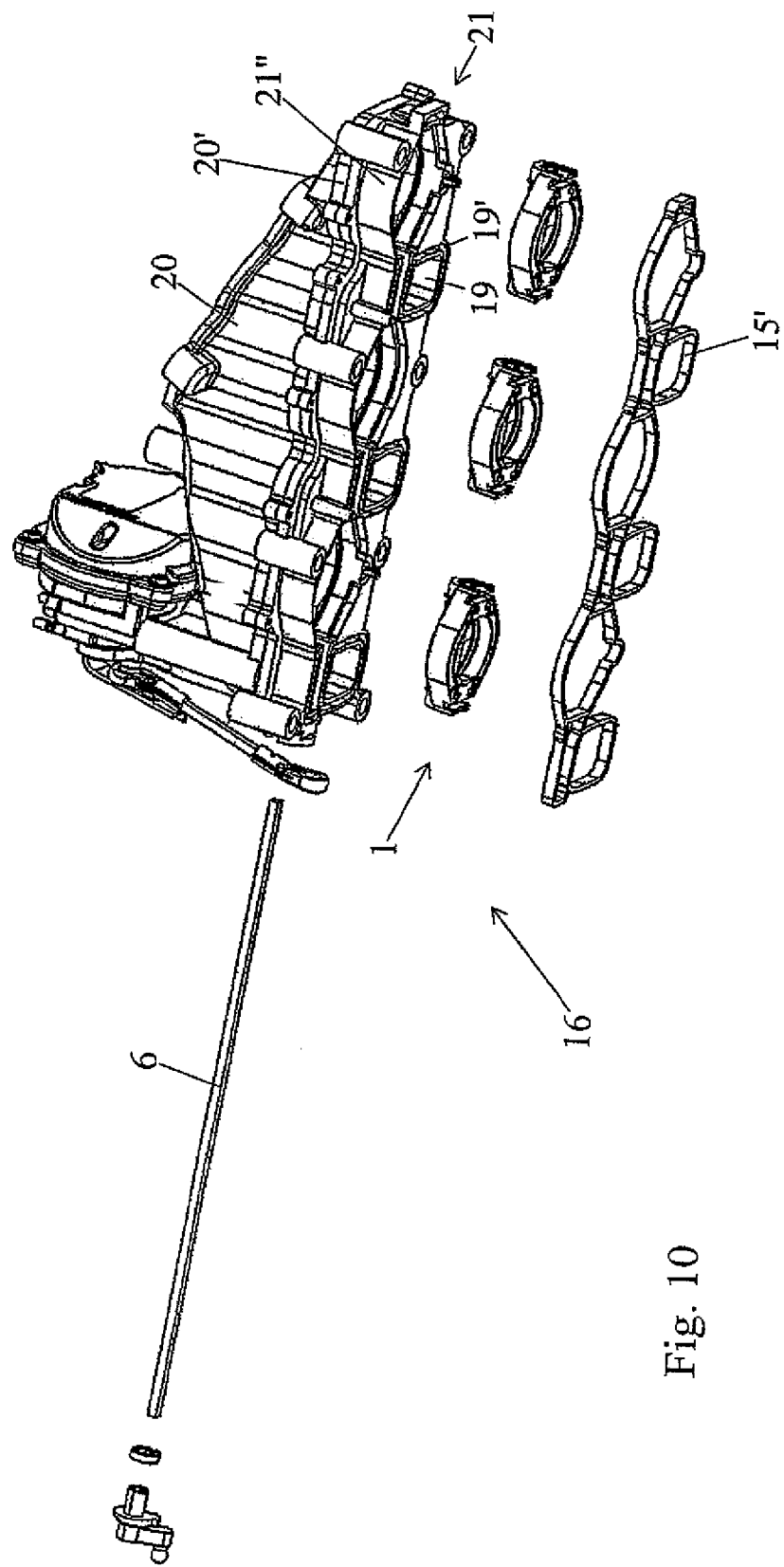
FIG. 10 is a perspective view of an intake manifold prior to the mounting of regulating devices as illustrated in FIGS. 1A to 1G and to the fitting of the seal for providing tightness with the cylinder block.

In order to limit the degree of wear and damage to the seal and to limit the disruption of the flow of fluid passing through the regulation device 1 in the open position of the valve body 3, it may advantageously be provided, as FIGS. 10G, 5B and 12 of the accompanying drawings show, that the annular support body 4 has a composition, and in particular an internal peripheral form, such that the first and second functional segments 7' and 7" of the seal 7 are set back relative to the contour of the planar projection of the passage 4' in the direction in which the flow passes through said passage, for example by comprising a wall having a greater (at least visible) thickness remote from the edge of said body 4 provided with said segments 7' and 7".

Alternatively, a thinning of the wall of the support body 4 may also be provided in the region of the internal peripheral portions 4" and 4'" receiving the functional segments 7' and 7".

The protection measure relates primarily to the functional segment 7" in the form of a wing protruding toward the interior of the passage 4', the functional segment 7' having its end located outside said passage 4' owing to the fact that it extends toward the exterior.

As FIGS. 1 to 5, 6A and 6B of the drawings show, the bearings 5 may be provided, on the face opposing the face intended to be placed around the opening 2, the flow of which is to be regulated, with a groove 15 for accommodating a compression seal 15'. This groove 15 may extend through the base 23' (or the extensions 24 thereof) and the body 5' of the bearing 5 forming a housing for the bearing elements 5".

The seal 15' may optionally be extended to form an annular seal encircling the support body in the region of its opposing face, which is not intended to be placed around the opening 2, the outlet of which is to be regulated.

Figure 6A:
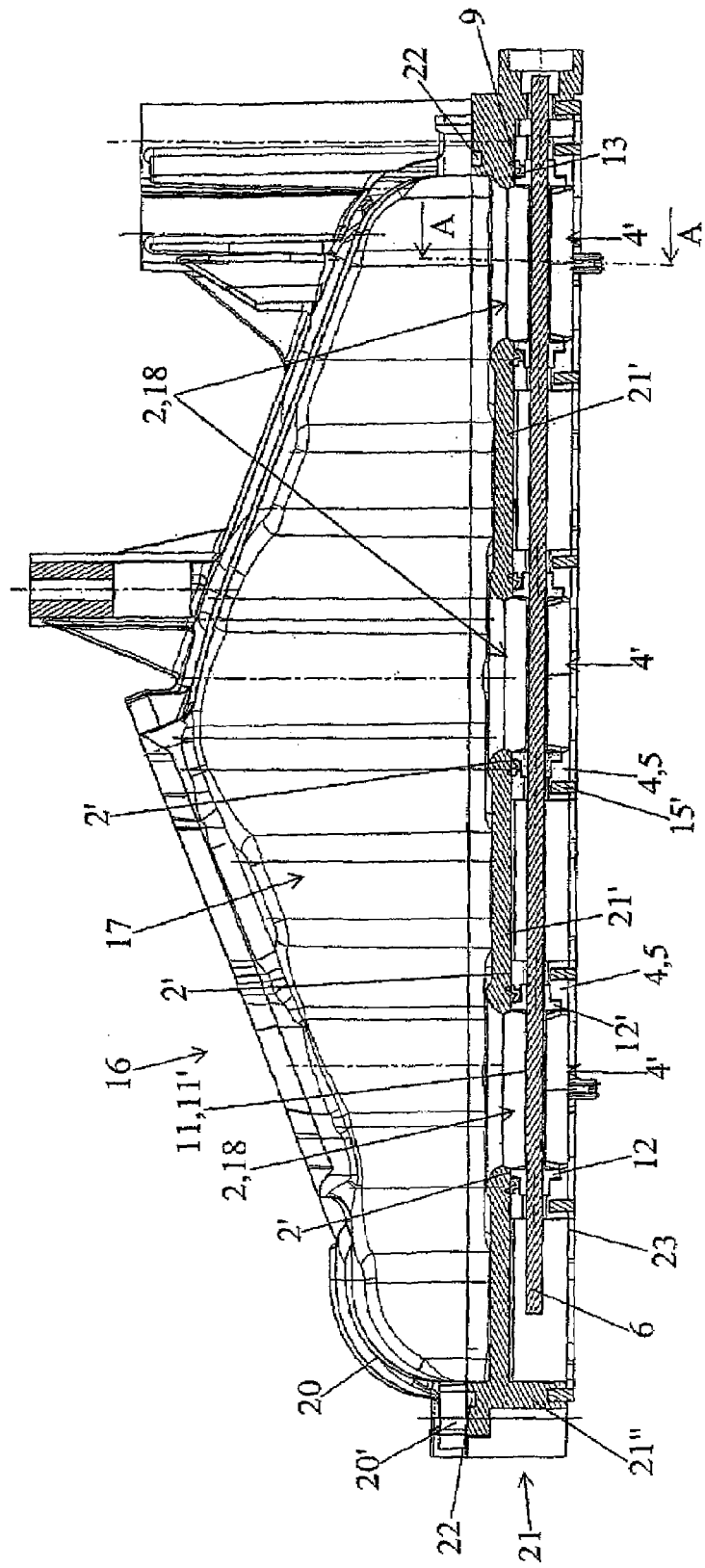
FIGS. 6A and 6B are cross-sections of an intake manifold integrating three regulating devices as illustrated in FIGS. 2 to 5, the valves being in the closed position (6A) and the maximum open position (6B), respectively.
Figure 6B:
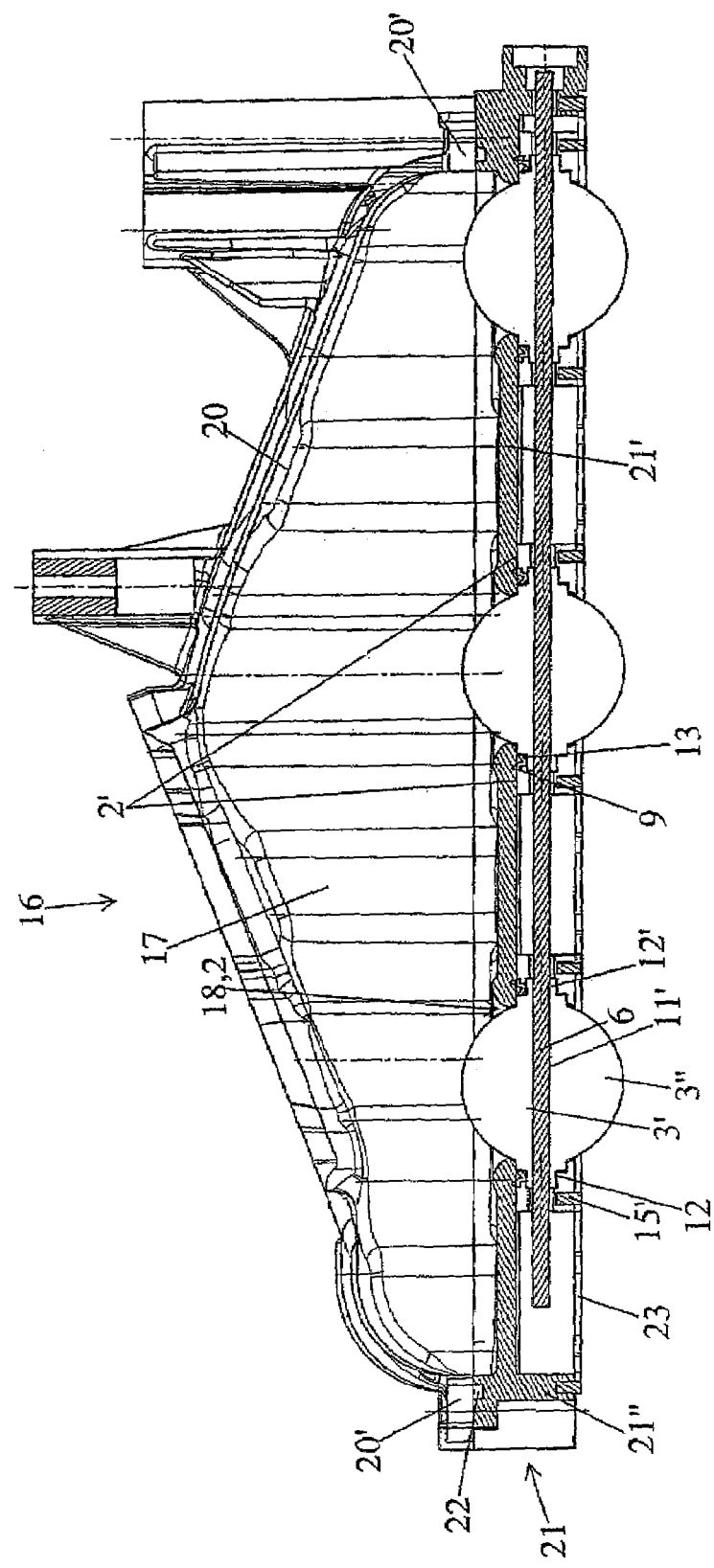
Figure 7:
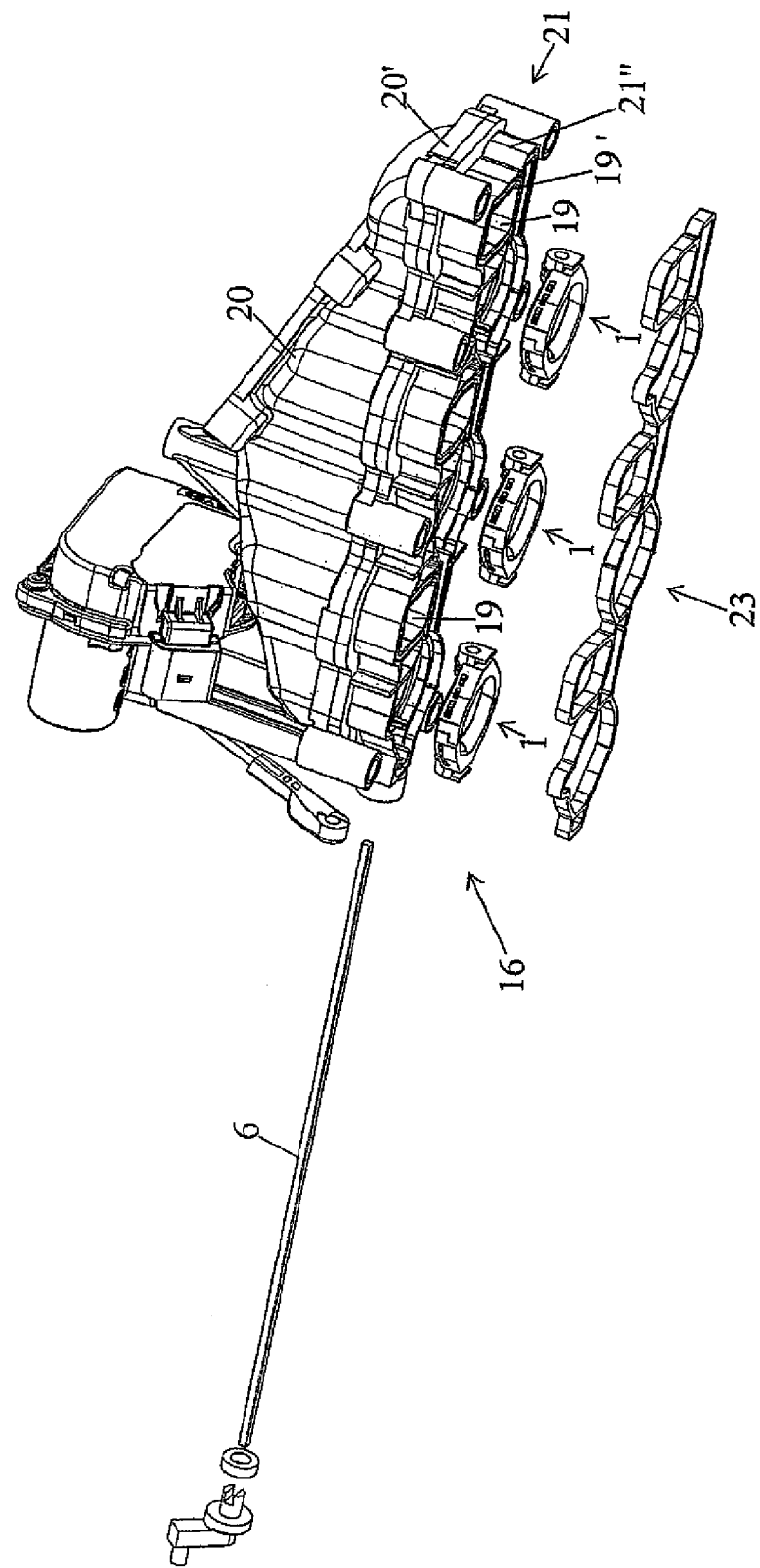
FIG. 7 is a partially exploded perspective view of the manifold of FIGS. 6A and 6B, the regulating devices not being mounted in the body having a planar structure enclosing the chamber of the manifold and integrating the outlets.

The present invention also relates, as illustrated in FIGS. 6A, 6B and 7 of the accompanying drawings, to an intake manifold or distributor 16 comprising an inlet, a chamber 17 and a plurality of outlets 18, optionally extended by pipes 19, the flow rate and/or losses in pressure at least one, preferably a plurality, of said outlets 18 being regulated.

This manifold or distributor 16 is characterised in that each outlet 18, the through-flow of which is regulated, comprises on its downstream side a regulating device 1 as described above, the various regulating devices 1 that may be present preferably being mutually aligned and passed through by the same control pin 6.

According to a preferred embodiment, the manifold or distributor 16 mainly consists of two portions, namely a first hollow body 20 with a wall delimiting the chamber 17, integrating the inlet and indented in the zone of the outlets, and a second body 21 having a planar structure with a central plate 21' and a peripheral edge 21", this second body 21 enclosing the indented region of the hollow body 20 and integrating the outlets 18, some of which comprise regulating devices 1 attached at the outer openings 2 of said outlets.

Figure 8:
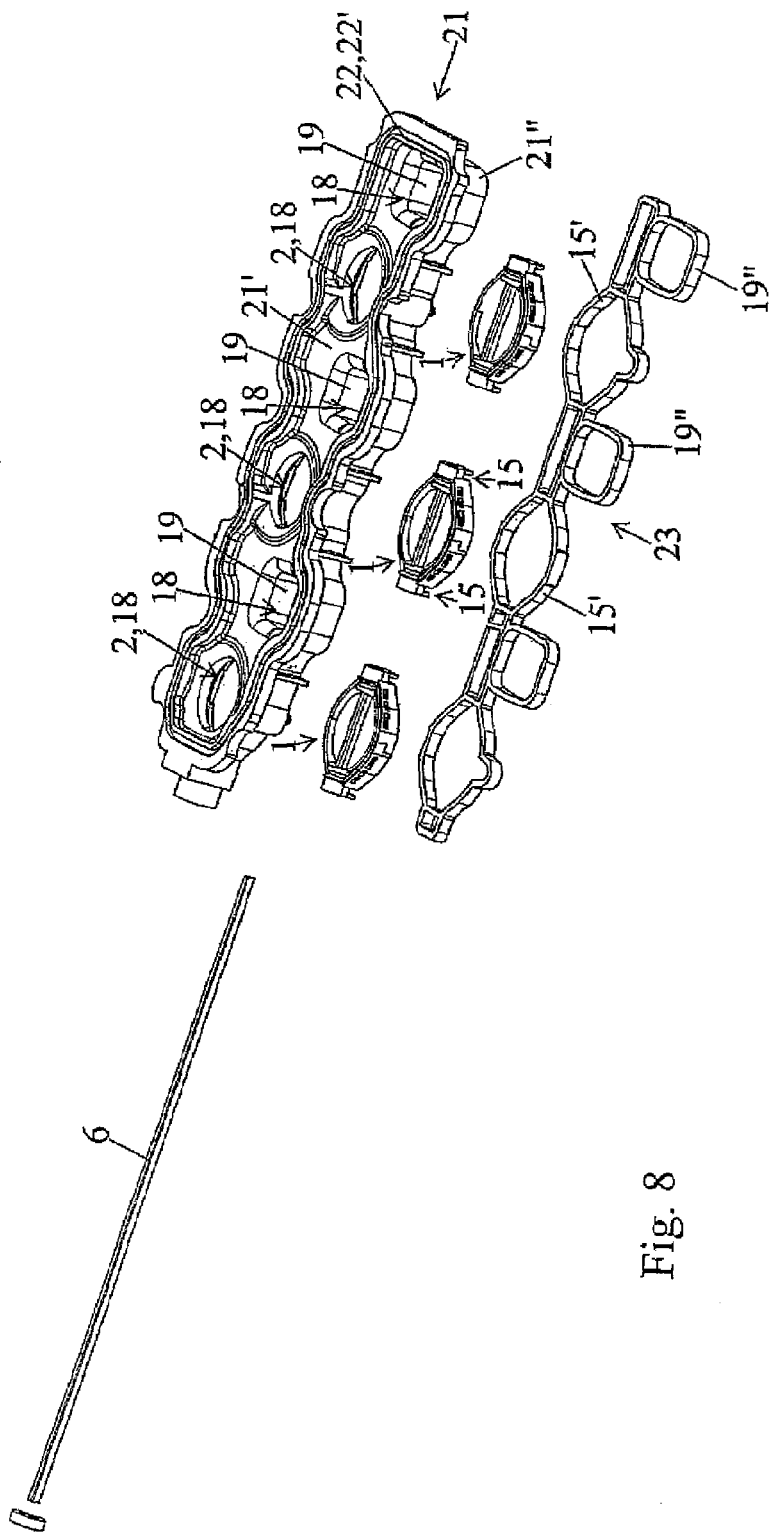
FIGS. 8 and 9 are exploded perspective views, from two different angles, of regulating devices prior to the mounting thereof in the body having a planar structure forming part of the intake manifold illustrated in FIGS. 6A, 6B and 7.
Figure 9:
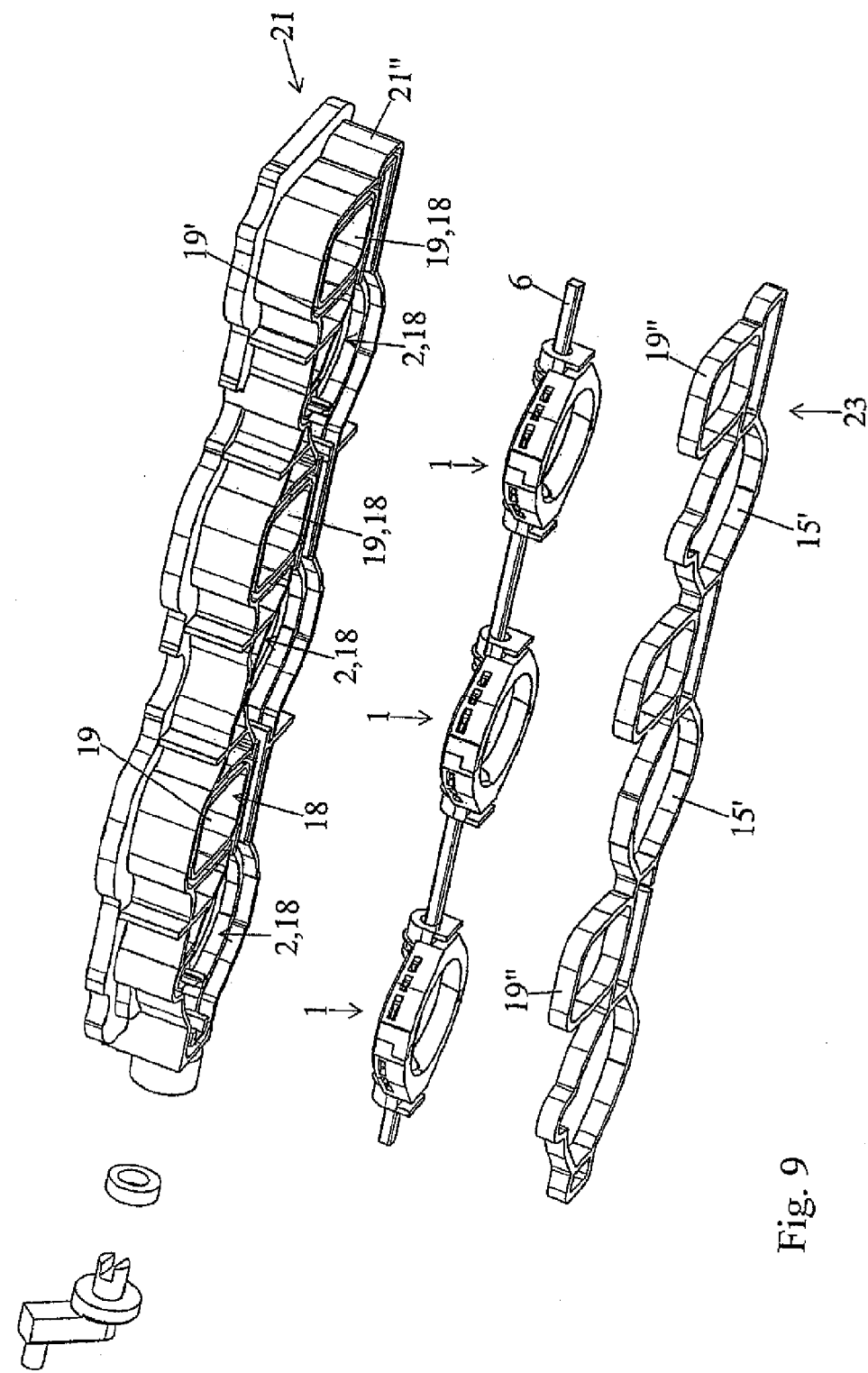

As FIGS. 7 to 9 of the accompanying drawing show, the outlets 18, the through-flows of which are not regulated, are extended by conduit portions forming pipes 19, the annular support bodies 4 of the regulating devices 1 attached around openings 2 of the regulated outlets 18, in matching mounting sites, having a height or thickness (in the direction of the through-flow) substantially identical to the length of the aforementioned conduit portions forming pipes 19, and preferably substantially identical to the height of the peripheral edge 21".

The regulating devices 1 are then mounted (in a compressed sandwich arrangement) between the openings 2 of the outlets 18 and the inlets of the cylinder block (not shown), said devices 1 resting in an opposing manner, on the edge regions surrounding these openings, at their support body 4 and the bodies 5' of their bearings 5 (optionally also at the bases 23' of the bearing elements 5").

Advantageously, the outlets 18 present in the central plate 21' of the body 21 having a planar structure open out toward the interior of the chamber 17. Furthermore, the body 21 having a planar structure has, on the side of the peripheral edge 21' bearing against an opposing edge 21' of the hollow body 21, a groove 22 for receiving a compression seal 22' intended to seal the assembly formed by the hollow body 20 and the body 21 having a planar structure, and the conduit portions forming pipes 19 have, on their free edges, a groove 19' for receiving a compression seal 19", said edges and the seals 15' fitted in the grooves 15 of the bearings 5, and optionally surrounding the support bodies 4 of the regulating devices 1 on their face opposing that placed around the openings 2, optionally forming a single seal 23.

The opening-out toward the chamber 17 of the entrances of the outlets 18 allows the flow to be channelled through the opening 2 of these outlets and the turbulence associated with the edge effects to be limited. Furthermore, said opening-out allows the protruding functional joining segment 7" to be shielded from the direct action of the flow in the opening position of the valve body 3 of the device 1 in question.

According to a preferred embodiment of the invention emerging, in particular, from FIG. 12 of the accompanying drawings, the outlets 18, the flow of which is regulated by a device 1, and the annular support bodies 4 of the corresponding regulating devices 1, which are attached to openings 2 of said outlets 18, cooperate to define a conduit portion 26, in which are disposed the valve body 3 and the functional segments 7' and 7" of the seal 7, said functional segments being laterally set back so as not to be directly exposed to the through-flow of fluid in the open position of the valve body 3.

The opening-out of the outlets 18 and a thickening of the wall of the annular bodies 4, remote from their faces placed around the openings 2, may, for example, advantageously create restrictions in the conduit portion 25, the passage diameter of which is less than that existing in the region of the functional segments 7' and 7". Said functional segments are therefore not visible if the passage of said conduit portion 25 is inspected in the direction of flow of the fluid through said conduit portion.

Finally, the invention also relates to a vehicle having an internal-combustion engine comprising an air intake manifold or distributor mounted on the engine, characterised in that said manifold or distributor is a manifold or distributor 16 as described above and illustrated in the accompanying drawings.

The invention is not, of course, limited to the embodiments described and illustrated in the accompanying drawings. Modifications are possible, in particular with regard to the constitution of the various elements or by substitution of technical equivalents, without thereby departing from the scope of protection of the invention.

The invention claimed is:

1. A valve regulating device to regulate circulation of a fluid in a region of an opening comprising:
    a pivoting plate-shaped valve body;
    a annular-shaped support body providing a seat for at least a portion of a peripheral edge of the valve body;
    wherein the support body carries or integrates two opposing bearings mounting the valve body in a rotational manner;
    said valve regulating device further comprising a control pin determining a position in rotation of the valve body and passing through the valve body by dividing it into two opposing shutter-like portions;
    wherein said valve body is displaced in rotation between a totally open position, in which the valve body opposes a minimum surface generated by a flow of the fluid, and a closed position, in which the valve body rests against the seat or a seat portion provided by the support body and closes a passage through the support body;
    said valve regulating device being configured to be attached in the region of the opening to be regulated by application of the support body against an edge delimiting the circumference of the opening,
    said valve regulating device configured to be mounted between an outlet and an inlet providing a passage portion therebetween,
    said valve regulating device wherein the support body is provided with a seal with, on the one hand, a first functional segment extending over a first portion of an internal periphery of the support body and bearing against a face of a first of the two shutter-like portions of the valve body in the closed position
    and, on the other hand, a second functional segment extending over a second portion of the internal periphery of the support body, having a different composition from that of the first functional segment and bearing against an opposing face of the second shutter-like portion of the valve body in the closed position,
    wherein the first and second functional segments of the seal have protruding lateral extensions, in the form of ribs, in a region of a face of the support body bearing against the edge of the opening,
    said extensions being interconnected by intermediate joining portions extending in a protruding manner over a respective body of the two opposing bearings, so as to provide a continuous peripheral seal around the opening in the region of which the flow is to be regulated when the regulating device is mounted on the opening.

2. A valve regulating device according to claim 1, wherein the valve body is mounted on the support body so as to be offset toward the face bearing against the edge of the opening, the first of the two shutter-like portions of the valve body pivoting as it moves away from the support body when the valve body leaves the closed position, while the second shutter-like portion pivots simultaneously within a internal passage of the support body, the first functional segment is subjected to compressive stress in the closed position of the valve body, between the valve body and the first portion of the internal periphery of the support body carrying the first functional segment and forming part of the seat, and the second functional segment extends in an overhang arrangement from the second portion of the internal periphery of the support body and is flexurally stressed by the valve body in the closed position.

3. A valve regulating device according to claim 2, wherein the first and second functional segments include lip seals and have profiled wing compositions following the contour of the internal periphery of the support body, the first functional segment of the seal includes a first wing inclined toward an exterior and formed in one piece with a base which rests on the first portion of the internal periphery of the support body, the inclined first wing is turned down and enters into surface contact with the base in the compressed state, and the second functional segment includes a second wing protruding toward an interior as a result of being slightly inclined, the second wing being at least slightly resiliently flexurally stressed under the action of the valve body when said valve body enters the closed position.

4. A valve regulating device according to claim 1, wherein the seal integrates the first and second functional segments, the extensions of the functional segments, and the intermediate joining portions, said intermediate joining portions having sealing lips extending the intermediate joining portions, wherein the seal is formed in one piece and is attached by overmoulding to the support body, in the region of the face of said support body that is placed around the opening, the flow of which is to be regulated.

5. A valve regulating device according to claim 1, wherein the support body, and the bearing bodies, are provided with sites for mechanically coupling or anchoring the seal, and the intermediate joining portions, in the form of cavities and passages allowing the establishment of bridges made from overmoulded material.

6. A valve regulating device to regulate circulation of a fluid in a region of an opening comprising:
    a pivoting plate-shaped valve body, having a peripheral edge;
    a annular-shaped support body providing a seat for at least a portion of the peripheral edge of said valve body;
    wherein the support body carries or integrates two opposing bearings mounting the valve body in a rotational manner;
    said valve regulating device further comprising a control pin determining a position in rotation of the valve body and passing through the valve body by dividing it into two opposing shutter-like portions;
    wherein the valve body is displaced in rotation between a totally open position, in which the valve body opposes a minimum surface generated by the flow of fluid, and a closed position, in which the valve body rests supported by the seat or a seat portion provided by the support body and closes a passage through the support body;

said valve regulating device configured to be attached in the region of the opening to be regulated by application of the support body against an edge delimiting a circumference of this opening;

said valve regulating device configured to be mounted between an outlet and an inlet by providing a passage portion therebetween;

said valve regulating device wherein the support body is provided with a seal with, on the one hand, a first functional segment extending over a first portion of a internal periphery of the support body and bearing against a face, of a first of the two shutter-like portions of the valve body in the closed position, and, on the other hand, a second functional segment extending over a second portion of the internal periphery of the support body, having a different composition from that of the first functional segment and bearing against the opposing face of the other or second shutter-like portion of the valve body in the closed position;

wherein the valve body comprises a central tubular formation providing a profile through-passage receiving the control pin with rotational locking, and in that said valve body is extended at the two opposing ends of said tubular formation by hollow fittings forming hubs having a tiered circular outer shape, said hub fittings cooperating to mount, in a freely rotational manner and with translational locking, the valve body in the opposing bearings of the support body, said bearings having respective bodies with an internal configuration matching the external configuration of the hub fittings, and said hub fittings having through-passages adjacent to the through-passage of the central tubular formation and also being passed through by the control pin;

wherein the bodies of the bearings protrude on the side of the support body that bears against the edge of the opening;

wherein the seal comprises intermediate joining portions in the form of an arc of a circle and the intermediate joining portions are each extended by a sealing lip bearing against a respective hub fitting of the valve body engaged with the bearings, so as to form, in cooperation with the two functional segments of the seal, a continuous seal between the support body and the valve body in the closed position of the valve body.

7. A valve regulating device according to claim 6, wherein a portion of the bodies of the bearings that protrude relative to the annular support body is partially indented so that only an end portion of the hub fitting is held and guided in the bearing, the sealing lip at least resting on a released hub fitting portion of a smaller diameter.

8. A valve regulating device according to claim 7, wherein each of the sealing lips, are in the form of an arc of a circle and rest on one of the two hub fittings, said sealing lips define a cross section substantially in the shape of a V, a wing of which is connected to the corresponding intermediate joining portion, the other wing of which bears at its free end against a shoulder formed by a projection of the hub fitting, wherein a median ridge is formed at the intersection of the two wings, and bears against the released hub fitting portion of smaller diameter.

9. A valve regulating device to regulate circulation of a fluid in a region of an opening comprising:
a pivoting plate-shaped valve body;
a annular-shaped support body providing a seat for at least a portion of a peripheral edge of the valve body,
wherein said annular support body carries or integrates two opposing bearings mounting the valve body in a rotational manner;
said valve regulating device further comprising a control pin determining a position in rotation of the valve body and passing through the valve body by dividing it into two opposing shutter-like portions;
wherein said valve body is displaced in rotation between a totally open position, in which the valve body opposes a minimum surface generated by the flow of fluid, and a closed position, in which the valve body rests supported by the seat or seat portion provided by the annular support body and closes a passage through the annular support body;
said valve regulating device configured to be attached in the region of the opening to be regulated by application of the annular support body against an edge delimiting the circumference of the opening, said valve regulating device to be mounted between an outlet and an inlet providing a passage portion therebetween;
wherein the annular support body is provided with a seal with, on the one hand, a first functional segment extending over a first portion of a internal periphery of the annular support body and bearing
against a face of a first of the two shutter-like portions of the valve body in the closed position and, on the other hand, a second functional segment extending over a second portion of the internal periphery of the annular support body, having a different composition from that of the first functional segment and bearing against the opposing face of the other or second shutter-like portion of the valve body in the closed position;
wherein the seal comprises intermediate joining portions in the form of an arc of a circle in a region of said bearings;
wherein the intermediate joining portions in cooperation with the two functional segments of the seal, form a continuous seal between the annular support body and the valve body in a closed state of the valve body;
wherein the annular support body and at least a portion of a body of the respective bearings are formed in a one-part piece,
wherein, the one-part piece comprises, on the one hand, two opposing segments of the annular support body forming the first and second portions of the internal periphery of the annular support body and, on the other hand, the bodies of the opposing bearings enclosing respective bearing elements, which are formed or attached in the bearing bodies.

10. A valve regulating device according to claim 9, wherein each bearing body forms a casing or structure for receiving the bearing element, the process for mounting said bearing element comprising wedged interlocking, with rotational locking, of the bearing element in the bearing body, and in that each bearing element comprises an upper portion integrating a recess for rotational guiding of the valve body, and a lower portion forming a support base for the bearing element when the regulating device is mounted between edges of two opposing openings.

11. A valve regulating device according to claim 10, wherein the lower portion forming the support base has lateral extensions defining recess portions for guiding two portions having different diameters of a tiered hub fitting of the valve body, wherein the lateral extensions are interlocked in a mating manner in corresponding cavities in the bearing body, which define the complementary portions of the guiding recesses extending concentrically in extension of the recess in the upper portion of the bearing element.

12. A valve regulating device to regulate the circulation of a fluid in a region of an opening comprising:
- a pivoting plate-shaped valve body;
- a annular-shaped support body providing a annular seat for at least a portion of a peripheral edge of the valve body,
- wherein the annular support body carries or integrates two opposing bearings mounting the valve body in a rotational manner;
- the valve regulating device further comprising a control pin determining a position in rotation of the valve body and passing through the valve body by dividing it into two opposing shutter-like portions;
- wherein the valve body is displaced in rotation between a totally open position, in which the valve body opposes a minimum surface generated by a flow of fluid, and a closed position, in which the valve body rests supported by the annular seat or a seat portion provided by the annular support body and closes a passage through the annular support body;
- the valve regulating device being configured to be attached in the region of the opening to be regulated by application of the annular support body against the edge delimiting the circumference of the opening, the valve regulating device configured to be mounted between an outlet and an inlet by providing a passage portion therebetween;
- wherein the annular support body is provided with a seal with, on the one hand, a first functional segment extending over a first portion of an internal periphery of the annular support body bearing against a face of a first of the two shutter-like portions of the valve body in the closed position,
- and on the other hand, a second functional segment extending over a second portion of an internal periphery of the annular support body, having a different composition from that of the first functional segment and bearing against an opposing face of the other or second shutter-like portion of the valve body in the closed position;
- wherein the seal comprises intermediate joining portions in a region of the bearings and wherein the intermediate joining portions in cooperation with the two functional segments of the seal, form a continuous seal between the annular support body and the valve body in the closed state of the valve body;
- wherein the annular support body comprises two half-body portions joined at a plane perpendicular to the plane of the annular support body and median relative to the two bearings;
- wherein assembly is produced by connection by mutual nesting of respective free ends of the annular support body portions and each half-body integrates a bearing extended on a side so as together to secure the valve body in said rotational manner.

13. A valve regulating device according to claim 12, wherein the seal integrates the first and second functional segments and extensions of the functional segments, the intermediate joining portions and sealing lips extending the intermediate joining portions;
- the seal is formed in one piece and is attached by overmoulding to the annular support body, in a region of a face of the annular support body that is placed around the opening, a flow of which is to be regulated.

14. A valve regulating device according to claim 12, wherein each half-body is provided with a half-seal comprising, in the form of an overmoulded portion, one half of the first functional segment, one half of the second functional segment, corresponding halves of lateral extensions of the functional segments, the intermediate joining portion connecting the two aforementioned functional segment halves and a sealing lip extending the intermediate joining portion.

15. A valve regulating device according to claim 14, wherein the two half-bodies assembled by mutual nesting of the free ends of the two support body portions are provided with matching incisions, the two halves of the first and second functional segments of the seal entering into adjacent abutment in the assembled state of the two half-bodies, and the assembly being locked by resilient engagement or coupling in a region of the incisions in the joined free ends of the annular support body portions.

16. A valve regulating device according to claim 12, wherein the annular support body has a composition, and in particular an internal peripheral form, such that the first and second functional segments of the seal are set back relative to a contour of a planar projection of the passage in a direction in which flow passes through the passage, the annular support body comprising a wall having a greater thickness remote from an edge of the annular support body
- provided with the functional segments and, the bearings being provided with a groove for accommodating a compression seal, on a annular support body face opposite the face intended to be placed around the opening, a flow of which is to be regulated.

17. A intake manifold or distributor comprising an inlet, a chamber and a plurality of outlets, a flow rate and/or losses in pressure of at least one of said outlets being regulated, said intake manifold or distributor wherein each outlet,
- the through-flow of which is regulated, comprises on its downstream side a valve regulating device according to claim 1, the valve regulating devices that are present being mutually aligned and passed through by the same control pin.

18. A intake manifold or distributor according to claim 17, comprising two portions; a first hollow body with a wall delimiting the chamber, integrating the inlet and indented in a region of the outlets;
- and a second body having a planar structure with a central plate and a peripheral edge, this second body enclosing the indented region of the hollow body and integrating the outlets, some of which comprise valve regulating devices attached at the outer openings of said outlets.

19. A intake manifold or distributor according to claim 18, wherein the outlets, the through-flows of which are not regulated, are extended by conduit portions forming pipes, the annular support bodies of the valve regulating devices attached around openings of the regulated outlets, in mounting sites, having a height or thickness substantially identical to the length of the conduit portions forming pipes, and substantially identical to the height of the peripheral edge.

20. A intake manifold or distributor according to claim 18, wherein outlets in the central plate of the body having a planar structure open out toward the interior of the chamber, the body having a planar structure having on the side of the peripheral edge bearing against an opposing edge of the hollow body, a groove for receiving a compression seal to seal an assembly formed by the hollow body and the body having a planar structure, and in that the conduit portions forming pipes have free edges with a groove for receiving a compression seal, wherein the compression seal in the free edges, the seals fitted in grooves of the bearings, and seals surrounding the support bodies of the regulating devices on a face opposing the support body face placed around the openings, form a single seal.

21. A intake manifold or distributor according to claim 17, wherein the outlets, the flow of which is regulated by the valve regulating device, and the annular support bodies attached to openings of the outlets, define a conduit portion, in which are disposed the valve body and the functional segments of the seal, the functional segments being laterally set back so as not to be directly exposed to the through-flow of fluid in the open position of the valve body.

22. A intake manifold or distributor according to claim 17 mounted on an engine wherein the engine is mounted in a vehicle.

* * * * *